(12) United States Patent
Janosik et al.

(10) Patent No.: US 6,669,379 B2
(45) Date of Patent: Dec. 30, 2003

(54) METHOD OF ATTACHING OPTICAL FIBER IN ALIGNMENT WITH A LIGHT SOURCE IN AN OPTICAL MODULE

(75) Inventors: Zbigniew Janosik, Cedar Grove, NJ (US); Robert Wallace Roff, Westfield, NJ (US)

(73) Assignee: Princeton Lightwave, Inc., Cranbury, NJ (US)

( * ) Notice: Subject to any disclaimer, the term of this patent is extended or adjusted under 35 U.S.C. 154(b) by 49 days.

(21) Appl. No.: 10/109,679

(22) Filed: Apr. 1, 2002

(65) Prior Publication Data

US 2003/0185524 A1 Oct. 2, 2003

(51) Int. Cl.[7] .............................. G02B 6/36; G02B 6/00
(52) U.S. Cl. ............................ 385/91; 385/81; 385/136
(58) Field of Search ............................ 385/81, 91, 136

(56) References Cited

U.S. PATENT DOCUMENTS

| | | | | |
|---|---|---|---|---|
| 4,479,698 A | * | 10/1984 | Landis et al. | 350/96.2 |
| 5,177,807 A | * | 1/1993 | Avelange et al. | 385/91 |
| 5,210,811 A | * | 5/1993 | Avelange et al. | 385/91 |
| 5,631,989 A | * | 5/1997 | Koren et al. | 385/91 |
| 6,516,130 B1 | * | 2/2003 | Jang | 385/136 |
| 6,565,266 B2 | * | 5/2003 | Mun et al. | 385/88 |

* cited by examiner

Primary Examiner—John D. Lee
Assistant Examiner—Tina M Lin
(74) Attorney, Agent, or Firm—Duane Morris LLP

(57) ABSTRACT

A method of aligning an optical fiber to a light source (e.g., a laser diode) in an optical assembly includes inserting a weld clip over a ferrule holding the optical fiber so that there is no gap between the ferrule and the weld clip, initially aligning the optical fiber to the laser diode, fixedly attaching the weld clip to a platform, realigning the optical fiber to the laser diode, and fixedly attaching the weld clip to the ferrule.

23 Claims, 4 Drawing Sheets

METHOD OF ATTACHING OPTICAL FIBER IN ALIGNMENT WITH A LIGHT SOURCE IN AN OPTICAL MODULE

BACKGROUND OF THE INVENTION

1) Field of the Invention

This invention pertains to the field of optical modules, and more particularly, a method for fabricating an optical module by fixedly attaching an optical fiber to a platform such that the input aperture of the optical fiber remains in alignment with a light output of a light source (e.g., a laser diode) after attachment.

2) Description of the Related Art

FIG. 1 shows an exemplary optical module 100. The optical module 100 is a so-called "butterfly module," so named because it has a plurality of electrical leads 105 (e.g., seven) extending from first and second sides 102, 104 on opposite sides of the optical module 100, and an output optical fiber 110 extending from a third side 106 generally perpendicular to the first and second sides 102, 104. The optical module 100 also includes platform 120 on which is mounted a light source (e.g., a laser diode 130) which outputs and supplies light to an input aperture 112 of the optical fiber 110.

A critical characteristic of the optical module 100 is the alignment of the light output of the laser diode 130 and the input aperture 112 of the optical fiber 110. Especially in the case of a single mode fiber, it is critically important that the light output of the laser diode 130 be precisely aligned with the input aperture 112 of the optical fiber 110. However, in the prior art, after the laser diode 130 and the optical fiber 110 are precisely aligned, they are subject to significant misalignment during the process of attaching the optical fiber 110 (and/or the laser diode 130) to the platform 120 of the optical module 110.

Accordingly, it would be advantageous to provide an improved method of fabricating an optical module. In particular, it would be advantageous to provide such a method including an improved method of fixedly attaching an optical fiber to a platform of the optical module such that the optical fiber and a light source remain precisely aligned even after they are both attached to the platform. Other and further objects and advantages will appear hereinafter.

SUMMARY OF THE INVENTION

The present invention comprises a method for fabricating an optical module, including a method of fixedly attaching an optical fiber to a platform of the optical module such that the input aperture of the optical fiber remains in alignment with a light output of a light source (e.g., a laser diode) after attachment.

In one aspect of the invention, a method is provided for fabricating an optical module including a laser diode producing light, an optical fiber having an input aperture aligned to receive the light, a ferrule fit around an exterior of the optical fiber, and a platform. A weld clip is provided having a pair of vertical walls each connected to a corresponding base wall formed at an angle of less than 90 degrees with respect to the corresponding vertical wall. The weld clip is inserted over the ferrule so that there is no gap between the ferrule and the vertical walls of the weld clip. The optical fiber is initially aligned to the laser diode to substantially optimize (e.g., to substantially maximize) coupling of light into the input aperture of the optical fiber. Next, the weld clip is fixedly attached to the platform via the base walls, creating a gap between the optical fiber and the vertical walls of the weld clip. Subsequently, the optical fiber is realigned to the laser diode to substantially optimize coupling of light into the input aperture of the optical fiber. Finally, the weld clip is fixedly attached to the ferrule.

In another aspect of the invention, a method is provided for fabricating an optical module including a light source producing light, an optical fiber having an input aperture aligned to receive the light, a ferrule fit around an exterior of the optical fiber, and a platform. The method comprises inserting a weld clip over the ferrule so that there is no gap between the ferrule and the weld clip, initially aligning the optical fiber to the light source to substantially optimize coupling of light into the input aperture, attaching the weld clip to the platform, realigning the optical fiber to the light source to substantially optimize coupling of light into the input aperture; and attaching the weld clip to the ferrule.

DESCRIPTION OF THE PREFERRED EMBODIMENTS

Figure 1:
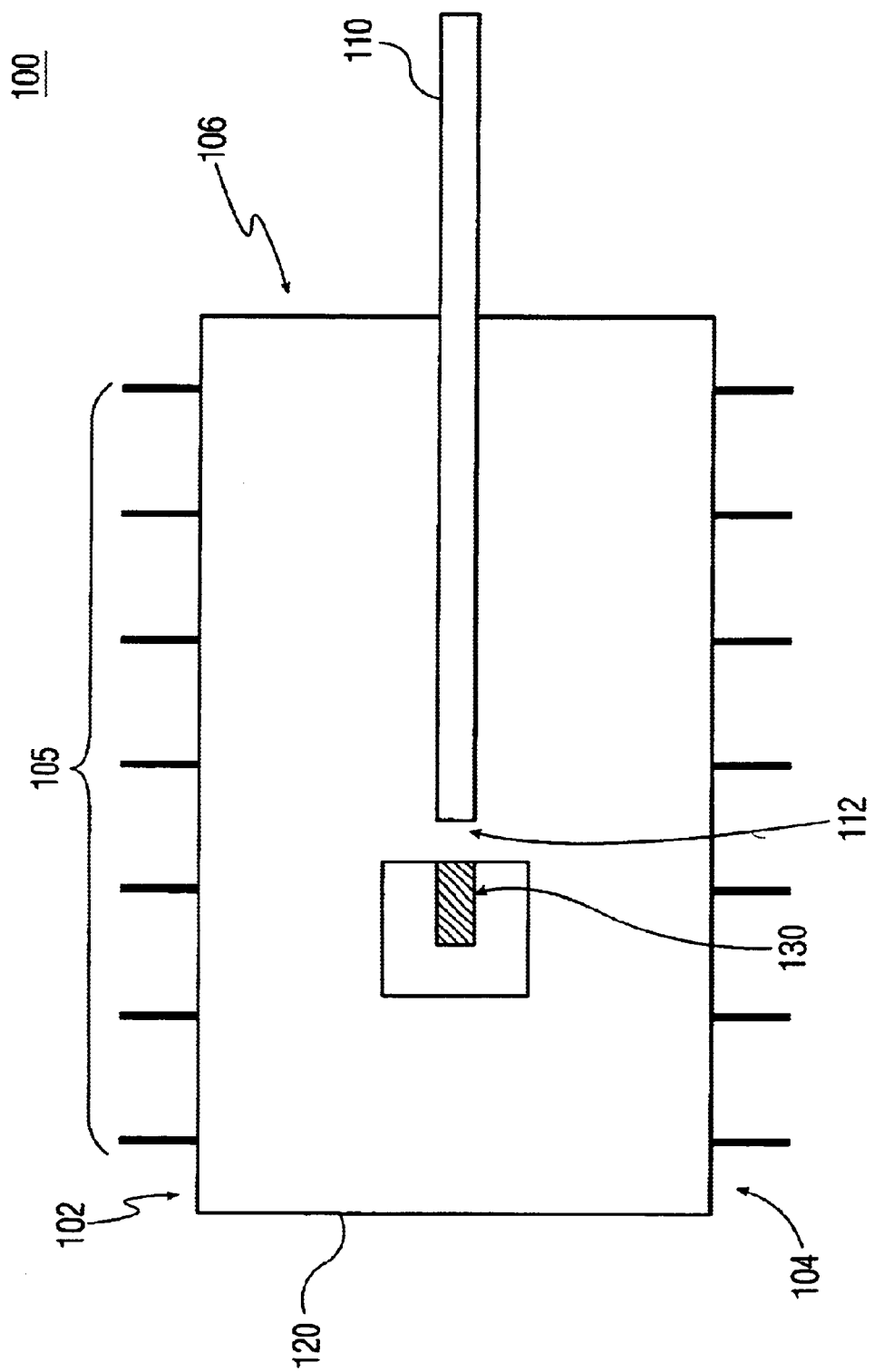
FIG. 1 is a diagram of an exemplary "butterfly" type optical module.
Figure 2:
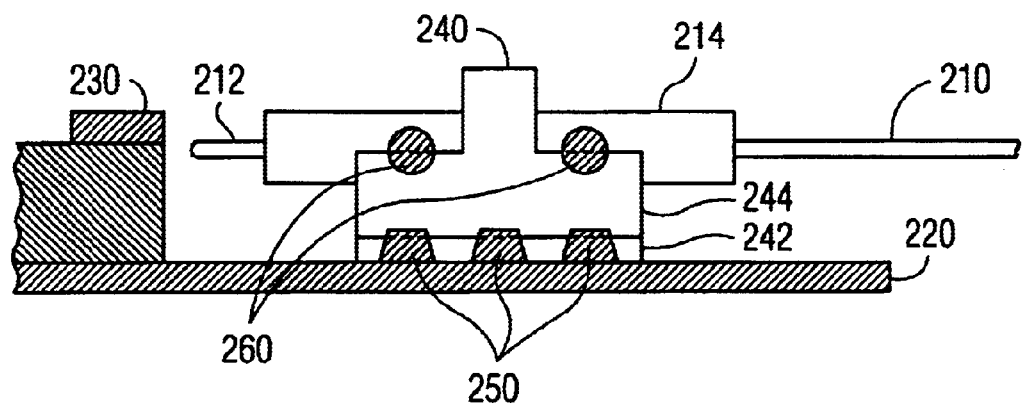
FIG. 2 is a side view of a portion of an optical module, illustrating a method of attaching the optical fiber to a platform while maintaining alignment between the optical fiber and a light source.

FIG. 2 shows a side view of a portion of an optical module 200. Portions of the optical module 200, such as electrical leads, having no bearing on the present invention are not shown so as not to obscure the present invention. In relevant part, the optical module 200 includes an optical fiber 210, a platform 220, and a light source (e.g., a laser diode 230). The optical fiber 210 has an input aperture 212, which is to be precisely aligned for optimally receiving light from the light source 230. A ferrule 214 is fit around the exterior of a portion of the optical fiber 210. The ferrule 214 is adapted to be grasped and thereby permit the optical fiber 210 to be held in place or moved, as desired.

A weld clip 240 holds and attaches the optical fiber 210 to the platform 220. Beneficially, the weld clip 240 includes a pair of base walls 242 each connected to a corresponding one of a pair of substantially vertical walls 244. In on embodiment, the substantially vertical walls 244 include a longer, lower vertical wall portion and a shorter, upper vertical wall portion. An arching bridge beneficially connects the upper vertical walls. Advantageously, as can be seen from FIG. 4, the weld clip 240 is configured such that an angle formed between each substantially vertical wall 244 and the corresponding base wall is less than 90 degrees (i.e., an acute angle).

Figure 3:
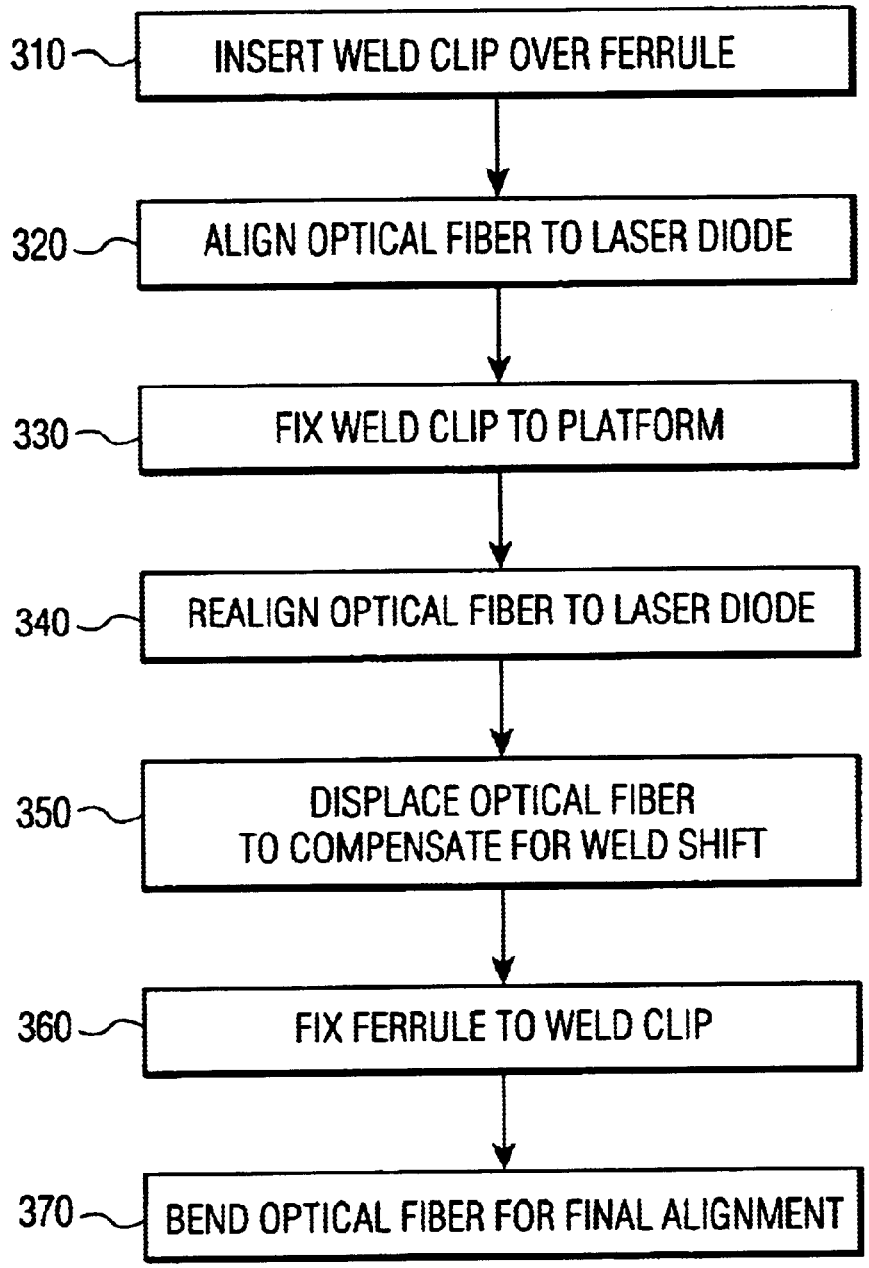
FIG. 3 is a flowchart illustrating steps of a method of attaching the optical fiber to a platform while maintaining alignment between the optical fiber and a light source.

FIG. 3 illustrates steps of a method 300 of attaching the optical fiber 210 to the platform 220 while insuring alignment between the optical fiber 210 and the light source 230.

In a first step 310, the weld clip 240 is inserted over the ferrule 214. At this time, the weld clip 240 is rather forcefully inserted over the ferrule 214 such that the ferrule is in contact with the inside surfaces of the substantially vertical walls 244 of the weld clip 240. That is, no gap exists between the ferrule 214 and the inside surfaces of the substantially vertical walls 244 of the weld clip 240, and there exists friction between the ferrule 214 and the inside surfaces of the substantially vertical walls 244 of the weld clip 240. Moreover, beneficially, the weld clip 240 is inserted in such a way that it creates friction between the weld clip 240 and the platform 220 during the subsequent alignment. Such friction is only apparent at the beginning of the alignment process.

In a step 320, the ferrule 214 is grasped, beneficially by a mechanical arm of a robot (not shown). The mechanical arm may optionally grasp the ferrule 214 before the weld clip 240 is inserted over the ferrule 214 in the step 310. The mechanical arm thereby moves the optical fiber 210 until it achieves a substantially optimal (e.g., a substantial maximum) coupling of light from the laser diode 230 input the input aperture 212 of the optical fiber 210. Beneficially, a feedback system is used to control the mechanical arm. To optimally align the optical fiber 210 and the laser diode 230, an output end of the optical fiber 210 is connected to a measurement apparatus for measuring an intensity of light emerging from the optical fiber 210. Based on the measured light intensity, the measurement apparatus produces a feedback signal that is used to control the mechanical arm to achieve substantially optimal coupling of light from the laser diode 230 into the input aperture 212 of the optical fiber 210. The mechanical arm continues to move the ferrule 214 and the optical fiber 210 until substantially optimal light coupling into the optical fiber 210 is achieved.

Figure 4:
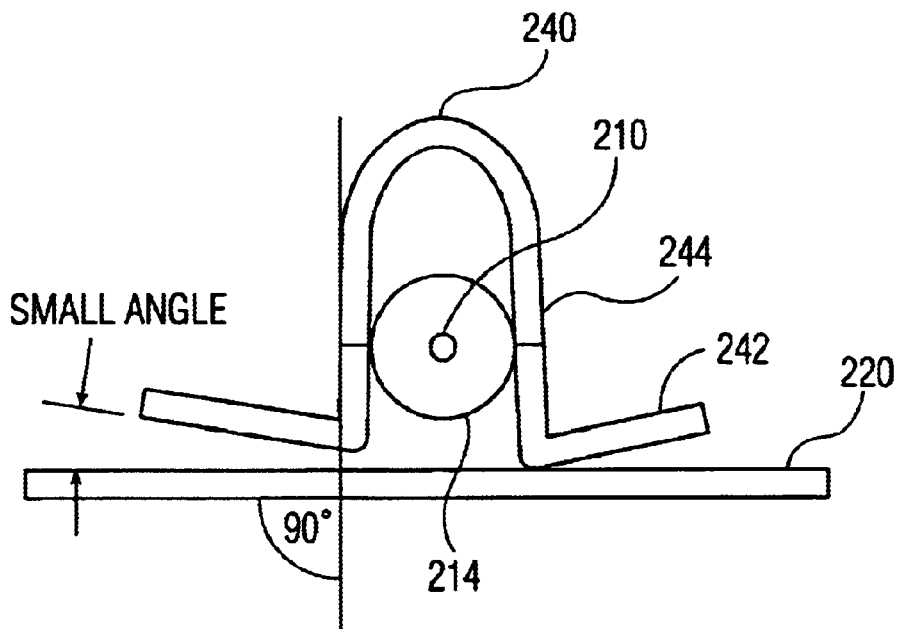
FIG. 4 is an end view diagram illustrating one step of a method of attaching the optical fiber to a platform while maintaining alignment between the optical fiber and a light source.

Typically, at the end of the alignment step 320, the base walls 242 of the weld clip 240 hover or float a couple of microns above the platform 220, as shown in FIG. 4. Also, beneficially, the base walls 242 of the weld clip 240 are not quite parallel with the top surface of the platform 220. Instead, as illustrated in FIG. 4, the base walls 242 of the weld clip 240 extend at a small, acute angle with respect to the top surface of the platform 220.

Figure 5:
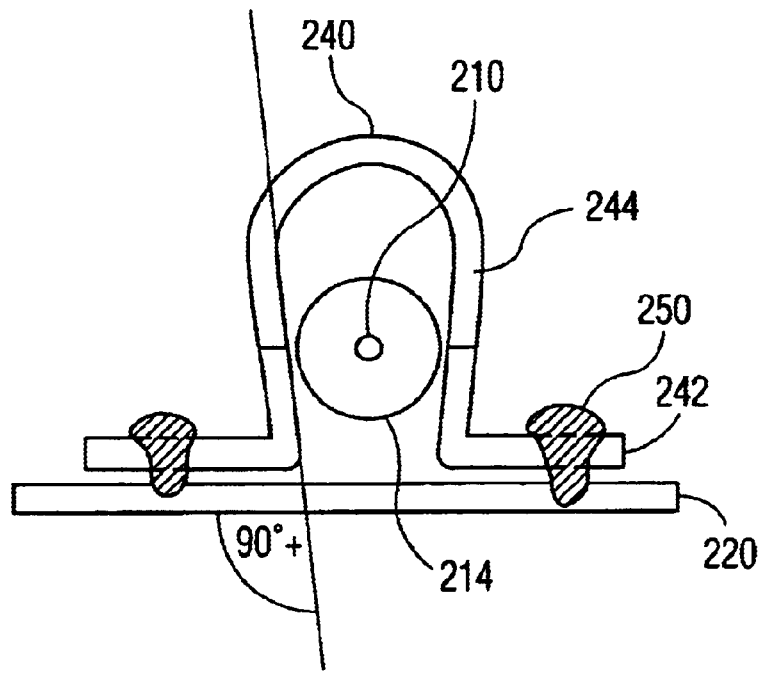
FIG. 5 is an end view diagram illustrating another step of a method of attaching the optical fiber to a platform while maintaining alignment between the optical fiber and a light source.

After the optical fiber 210 is aligned to the light from the laser diode 230, then in a step 330 the weld clip 240 is fixedly attached to the platform 220, preferably by means of a first set of welds 250, shown in FIG. 2. Upon welding the weld clip 240 to the platform 220, the base walls 242 of the weld clip 240 are pulled against the platform 220 due to shrinking of the melted metal as it cools down. As shown in FIG. 5, this in turn opens up the substantially vertical walls 244 of the weld clip 240, drawing them apart and away from the ferrule 214, thus releasing the ferrule 214 from being gripped by the weld clip 240 which is now attached to the platform 220. In other words, when the base walls 242 of weld clip 240 are welded to the platform 220, the substantially vertical walls 244 of the weld clip 240 are drawn away from the ferrule 214, opening up to produce a gap between the ferrule 214 and the inside surfaces of the substantially vertical walls 244 of the weld clip 240. This gap allows for virtually frictionless movement of the ferrule 214 in the vertical direction, while keeping the gap at a minimum.

Beneficially, the gap allows for a very small or even no weld shift of the ferrule 214 and optical fiber 210 in the horizontal direction after the weld clip 240 is attached to the platform 220.

The gap greatly simplifies the subsequent realignment & bending steps 340–370. In the step 340, the mechanical arm again moves the ferrule 214 to realign the optical fiber 210 until a substantially optimal (e.g., a substantial maximum) coupling of light from the laser diode 230 into the input aperture 212 of the optical fiber 210 is again achieved. As in the step 320, beneficially a feedback arrangement is employed to determine the optimal position of the optical fiber 210.

Next, in a step 350, the optical fiber 210 is moved vertically with respect to the optical platform 220 by a predetermined amount to account for a settling of the optical fiber 210 that will occur after cooling of the welds produced during a subsequent welding step 360. In a preferred embodiment, the cooling of the welds will produce a negative vertical displacement of the optical fiber 210 of 6–9 $\mu$m with respect to the optical platform 220. Accordingly, before the welding step 360, the optical fiber 210 is moved vertically with respect to the optical platform 220 by 6–9 $\mu$m m, beneficially 7.5 $\mu$m.

Next, in a step 360, the weld clip 240 is fixedly attached to the ferrule 214, preferably by means of a second set of welds 260, as shown in FIG. 2.

Beneficially, in a final step 370, the optical fiber 210 attached to the optical platform 220 via the weld clip 240 is bent slightly to optimize alignment with the laser diode 230.

Disclosed above is a method for attaching an optical fiber to an optical module such that the input aperture of the optical fiber remains in alignment with a light output of a light source after attachment. The method insures that the optical fiber and light source will remain precisely aligned even after they are both attached to a platform of the optical module.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of fabricating an optical module including a laser diode producing light, an optical fiber having an input aperture aligned to receive the light, a ferrule fit around an exterior of the optical fiber, and a platform, the method comprising:

providing a weld clip having a pair of substantially parallel vertical walls, each of the vertical walls being connected to a corresponding base wall to form an angle of less than 90 degrees with respect to the corresponding base wall;

inserting the weld clip over the ferrule such that the ferrule contacts an inner surface of each vertical wall of the weld clip;

grasping the ferrule;

moving the optical fiber to initially align the input aperture of the optical fiber to the laser diode to substantially optimize coupling of light from the laser diode into the input aperture;

attaching the base walls of the weld clip to the platform such that the vertical walls of the weld clip are drawn away from the ferrule to produce a gap between the ferrule and the vertical walls of the weld clip;

realigning the optical fiber to the laser diode to substantially optimize coupling of light into the input aperture; and attaching the weld clip to the ferrule.

2. The method of claim 1, wherein the step of grasping the ferrule occurs prior to inserting the weld clip over the ferrule.

3. The method of claim 1, wherein attaching the weld clip to the platform includes welding the weld clip to the platform.

4. The method of claim 3, wherein attaching the weld clip to the ferrule includes welding the weld clip to the ferrule.

5. The method of claim 1, wherein attaching the weld clip to the ferrule includes welding the weld clip to the ferrule.

6. The method of claim 1, wherein inserting the weld clip over the ferrule creates friction between the ferrule and respective inner surfaces of the substantially vertical walls of the weld clip.

7. The method of claim 1, wherein initially aligning the optical fiber to the laser diode to substantially optimize coupling of light into the input aperture comprises:

measuring light emerging from an output of the optical fiber; and moving the optical fiber until a substantially optimal coupling of light into the input aperture of the optical fiber exists.

8. The method of claim 1, wherein initially aligning the optical fiber to the laser diode to substantially optimize coupling of light into the input aperture comprises:

grasping the ferrule with a mechanical arm;

measuring light emerging from an output of the optical fiber;

providing a feedback signal to control movement of the mechanical arm based upon the measured light;

moving the mechanical arm in response to the feedback signal until a substantially optimal coupling of light into the input aperture of the optical fiber exists.

9. The method of claim 1, wherein realigning the optical fiber to the laser diode to substantially optimize coupling of light into the input aperture comprises:

measuring light emerging from an output of the optical fiber; and moving the optical fiber until a substantially optimal coupling of light into the input aperture of the optical fiber exists.

10. The method of claim 1, wherein realigning the optical fiber to the laser diode to substantially optimize coupling of light into the input aperture comprises:

grasping the ferrule with a mechanical arm;

measuring light emerging from an output of the optical fiber;

providing a feedback signal to control movement of the mechanical arm based upon the measured light;

moving the mechanical arm in response to the feedback signal until a substantially optimal coupling of light into the input aperture of the optical fiber exists.

11. The method of claim 1, further comprising moving the optical fiber by a predetermined amount with respect to the optical platform prior to attaching the weld clip to the ferrule.

12. The method of claim 11, further comprising bending the optical fiber to realign it with the laser diode after attaching the weld clip to the ferrule.

13. The method of fabricating an optical module including a light source producing light, an optical fiber having an input aperture aligned to receive the light, a ferrule fit around an exterior of the optical fiber, and a platform, the method comprising:

providing a welding clip with vertical walls each of which is connected to a corresponding base wall;

inserting a weld clip over the ferrule so that the ferrule contacts the weld clip;

initially aligning the optical fiber to the light source to substantially optimize coupling of the light into the input aperture of the optical fiber;

attaching the weld clip to the platform such that the vertical walls of the weld clip are drawn away from the ferrule to produce a gap between the ferrule and the vertical walls of the weld clip;

realigning the optical fiber to the light source to substantially optimize coupling of the light into the input aperture of the optical fiber; and attaching the weld clip to the ferrule.

14. The method of claim 13, wherein attaching the weld clip to the platform includes welding the weld clip to the platform.

15. The method of claim 13, wherein the weld clip includes a pair of base walls each extending to form an acute angle with respect to the platform, and wherein attaching the weld clip to the platform comprises welding the base walls to the platform.

16. The method of claim 13, wherein attaching the weld clip to the ferrule includes welding the weld clip to the ferrule.

17. The method of claim 13, wherein the weld clip includes a pair of substantially vertical walls and wherein attaching the weld clip to the ferrule comprises welding the substantially vertical walls to the ferrule.

18. The method of claim 13, wherein initially aligning the optical fiber to the light source to substantially optimize coupling of light into the input aperture of the optical fiber comprises:

measuring light emerging from an output of the optical fiber; and moving the optical fiber until a substantially optimal coupling of light into the input aperture of the optical fiber exists.

19. The method of claim 13, wherein initially aligning the optical fiber to the light source to substantially optimize coupling of light into the input aperture of the optical fiber comprises:

grasping the ferrule with a mechanical arm;

measuring light emerging from an output of the optical fiber;

providing a feedback signal to control movement of the mechanical arm based upon the measured light;

moving the mechanical arm in response to the feedback signal until a substantially optimal coupling of light into the input aperture of the optical fiber exists.

20. The method of claim 13, wherein realigning the optical fiber to the light source to substantially optimize coupling of light into the input aperture comprises:

measuring light emerging from an output of the optical fiber; and moving the optical fiber until a substantially optimal coupling of light into the input aperture of the optical fiber exists.

21. The method of claim 13, wherein realigning the optical fiber to the light source to substantially optimize coupling of light into the input aperture, comprises:

grasping the ferrule with a mechanical arm;

measuring light emerging from an output of the optical fiber;

providing a feedback signal to control movement of the mechanical arm based upon the measured light;

moving the mechanical arm in response to the feedback signal until a substantially optimal coupling of light into the input aperture of the optical fiber exists.

22. The method of claim 13, further comprising moving the optical fiber by a predetermined amount with respect to the optical platform prior to attaching the weld clip to the ferrule.

23. The method of claim 22, further comprising bending the optical fiber to realign it with the light source after attaching the welded clip to the ferrule.

* * * * *